US012015249B2

(12) United States Patent
Strangfeld et al.

(10) Patent No.: US 12,015,249 B2
(45) Date of Patent: Jun. 18, 2024

(54) ARRANGEMENT FOR FIRING SPARK GAPS

(71) Applicant: DEHN SE, Neumarkt i.d.Opf. (DE)

(72) Inventors: Uwe Strangfeld, Nuremberg (DE); Sebastian Haas, Weigendorf (DE)

(73) Assignee: DEHN SE, Neumarkt i.d.Opf (DE)

( * ) Notice: Subject to any disclaimer, the term of this patent is extended or adjusted under 35 U.S.C. 154(b) by 518 days.

(21) Appl. No.: 17/278,323

(22) PCT Filed: Sep. 11, 2019

(86) PCT No.: PCT/EP2019/074205
§ 371 (c)(1),
(2) Date: Mar. 21, 2021

(87) PCT Pub. No.: WO2020/078622
PCT Pub. Date: Apr. 23, 2020

(65) Prior Publication Data

US 2021/0351572 A1 Nov. 11, 2021

(30) Foreign Application Priority Data

Oct. 15, 2018 (DE) ......................... 102018125528.4
Jan. 21, 2019 (DE) ......................... 102019101448.4

(51) Int. Cl.
*H01T 2/02* (2006.01)
*H01T 4/10* (2006.01)

(52) U.S. Cl.
CPC *H01T 2/02* (2013.01); *H01T 4/10* (2013.01)

(58) Field of Classification Search
None
See application file for complete search history.

(56) References Cited

U.S. PATENT DOCUMENTS 4,054,813 A 10/1977 Agnoux et al. ............... 313/325
4,172,268 A * 10/1979 Yanabu ................ H01H 33/596 361/4

(Continued)

FOREIGN PATENT DOCUMENTS

DE 2658661 A1 7/1977 ............... H01T 2/02
DE 20020771 U1 2/2001 ............... H01T 2/02

(Continued)

OTHER PUBLICATIONS

An Office Action (in Hindi and English), dated May 25, 2022, issued by the Indian Patent Office for Applicant's related Indian Patent Application No. IN202147021571, filed May 13, 2021.

(Continued)

*Primary Examiner* — Thomas J. Hiltunen
(74) *Attorney, Agent, or Firm* — Bodner & Bodner, PLLC; Christian P. Bodner; Gerald T. Bodner

(57) ABSTRACT

The invention relates to an arrangement for firing spark gaps with a trigger electrode which is located at or in one of the main electrodes and which is insulated from this main electrode, wherein the trigger electrode can be electrically connected to a further main electrode via at least one voltage-switching or voltage-monitoring element and there is an air gap between the trigger electrode and the further main electrode, wherein the trigger electrode forms a sandwich structure with an insulating layer and a layer made of a material with lower conductivity than the material of one of the main electrodes. Moreover, the insulating layer is designed as a thin foil or lacquer layer and the layer made of the material of lower conductivity is in contact with one of the main electrodes or rests on it. According to the invention, for discharging energetically weak overvoltage events without response of the spark gap formed between the main electrodes, the insulating layer of the sandwich structure is interrupted outside the firing area and/or an (Continued)

Figure 1:
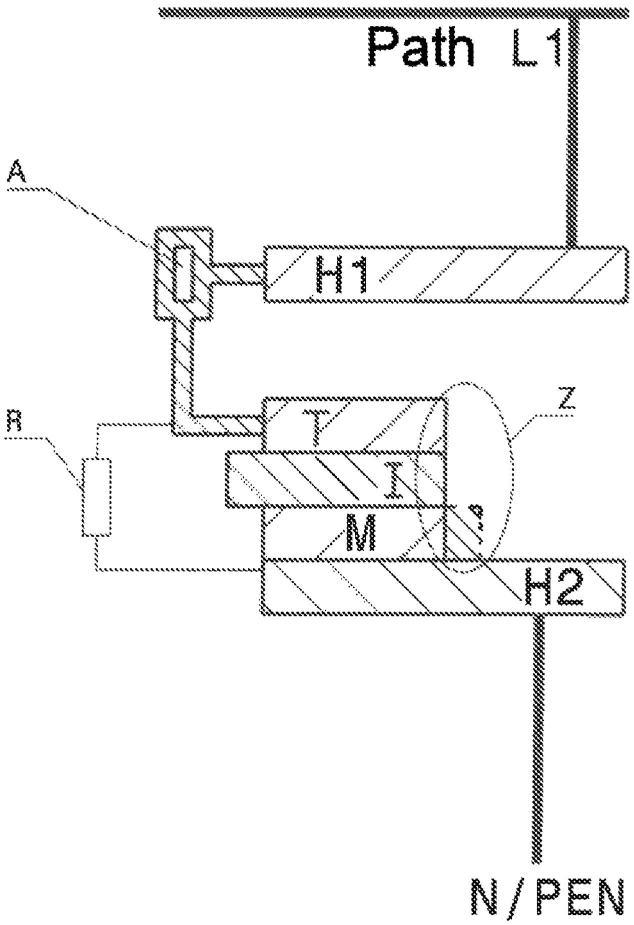

electrical component which influences the response behavior is connected between the trigger electrode and the associated main electrode.

7 Claims, 2 Drawing Sheets

(56) References Cited

U.S. PATENT DOCUMENTS

| | | | | | |
|---|---|---|---|---|---|
| 4,342,114 | A * | 7/1982 | Luck | H01S 3/09713 372/83 |
| 6,788,519 | B2 | 9/2004 | Zahlmann et al. | 361/129 |
| 7,476,823 | B2 * | 1/2009 | Rostron | G05F 1/00 361/131 |
| 7,817,395 | B2 | 10/2010 | Durth | 361/112 |
| 8,873,217 | B2 * | 10/2014 | Hierl | H01T 2/02 361/257 |
| 10,186,842 | B2 * | 1/2019 | Rozman | H01T 4/12 |
| 11,705,724 | B2 * | 7/2023 | Ehrhardt | H01T 1/02 361/104 |
| 2001/0000985 | A1 * | 5/2001 | Kobsa | H04M 3/18 361/111 |

FOREIGN PATENT DOCUMENTS

| | | | | |
|---|---|---|---|---|
| DE | 10146728 | A1 | 4/2003 | H01T 4/10 |
| DE | 102004006988 | A1 | 6/2005 | H01T 2/02 |
| DE | 10146728 | B4 | 1/2007 | H01T 2/00 |
| DE | 102011102937 | A1 | 2/2012 | H01T 2/02 |
| DE | 102014102065 | A1 | 8/2015 | H01T 1/20 |

OTHER PUBLICATIONS

The Notification Concerning Transmittal of International Preliminary Report on Patentability (Chapter I of the Patent Cooperation Treaty), in English, dated Apr. 29, 2021, which was issued by the International Bureau of WIPO in Applicant's corresponding international PCT application having Serial No. PCT/EP2019/074205, filed on Sep. 11, 2019.

The English translation of the International Preliminary Report on Patentability (Chapter I of the Patent Cooperation Treaty), dated Apr. 14, 2021, which was issued by the International Bureau of WIPO in Applicant's corresponding international PCT application having Serial No. PCT/EP2019/074205, filed on Sep. 11, 2019.

The Written Opinion of the International Searching Authority, in English, dated Nov. 27, 2019, which was issued by the International Bureau of WIPO in Applicant's corresponding international PCT application having Serial No. PCT/EP2019/074205, filed on Sep. 11, 2019.

The International Search Report, in English, dated Nov. 27, 2019, which was issued by the International Bureau of WIPO in Applicant's corresponding international PCT application having Serial No. PCT/EP2019/074205, filed on Sep. 11, 2019.

* cited by examiner

ARRANGEMENT FOR FIRING SPARK GAPS

The invention relates to an arrangement for firing spark gaps with a trigger electrode which is located at or in one of the main electrodes and which is insulated from this main electrode, wherein the trigger electrode can be electrically connected to the further main electrode via at least one voltage-switching or voltage-monitoring element and there is an air gap between the main electrode and the further main electrode, wherein the trigger electrode forms a sandwich structure with an insulating layer and a layer made of a material with lower conductivity than the material of one of the main electrodes, the insulating layer is designed as a thin foil or lacquer layer and the layer made of the material of lower conductivity is in contact with one of the main electrodes or rests on it according to the preamble of claim 1.

Spark gaps can be differentiated with regard to their behavior as a breakdown spark gap or sliding spark gap. Spark gaps of this type can be executed in a triggered manner but also in an untriggered manner. In the case of triggered spark gaps, at least one trigger electrode exists in addition to the main electrodes. The firing in the case of triggered spark gaps takes place either by using an ignition transformer with the result of a high response voltage of the correspondingly well insulated trigger electrode or alternatively by way of a particular arrangement of the trigger electrode relative to the main electrode without an ignition transformer.

Triggered spark gaps essentially possess a controllable response behavior.

In the case of the spark gaps arrangement, which is coupled in a pressure-resistant manner, for discharging harmful disturbance variables as a result of overvoltages according to DE 200 20 771 U1, a trigger voltage can be directly applied via a conductive housing which is present there for forming a partial spark gap in the discharge chamber. The main spark gap between the main electrodes is fired via the partial spark gap. Moreover, an ignition transformer is used there which is part of the trigger device.

However, ignition transformers require considerable installation space. In addition, the size of the firing voltage which is generated in the ignition transformer on the secondary side depends on the current change di/dT on the primary side. If a current pulse of this type does not possess a sufficient slope, the voltage which occurs on the secondary side is not sufficient to fire through the spark gap in a safe manner.

An ignition transformer may be omitted if the trigger electrode is in connection with one of the main electrodes. During the firing process, a sliding discharge is triggered between one of the main electrodes and the trigger electrode for solutions of this type, which sliding discharge, after a certain time, reaches the further main electrode and triggers the firing process.

A solution of this type is disclosed in DE 101 46 728 B4, for example.

Trigger electrodes of this type are in permanent electrical contact with one of the two main electrodes. This means that there is no galvanic isolation of the main potentials. For this reason, a voltage-switching element must be connected in the trigger circuit, for example in the form of a gas arrester.

An arrangement for firing spark gaps is known previously from DE 10 2011 102 937 A1 which has a trigger electrode which is located at or in one of the main electrodes and which is insulated from these main electrodes, and with which arrangement the response behavior can be specified over a wide range.

In this respect, the generic solution has a trigger electrode which forms a sandwich structure with an insulating layer and a layer made of a material with lower conductivity than the material of one of the main electrodes. The insulating layer is preferably designed as a thin foil or lacquer layer. The layer made of the material of lower conductivity is in contact with one of the main electrodes or rests on it.

The layer dielectric of the sandwich structure is represented as a series connection of a first partial capacitance with the dielectric of the insulating section and a second partial capacitance with the material of lower conductivity as a dielectric, wherein the partial capacitances are selected to be very low.

The material M of the sandwich structure possesses an often worse conductivity than the material of one of the main electrodes. The ignition arc is extended via the thickness of the layer made of the material M.

The thin insulating section between the trigger electrode and the layer made of poorly conductive material can preferably be realized by printed circuit boards. The trigger electrode then corresponds to the applied conductor track and the insulating layer to the lacquer layer which is located above it, wherein an end face section remains free of a lacquer layer.

The previously known solution according to DE 10 2011 102 937 A1, the disclosure content of which is explained to be the subject matter of the present application, creates a plasma jet or plasma beam in the base point area of an arrangement which is preferably designed as a horn spark gap. This beam results in a strong and fast purposeful movement of ionized gases and charge carriers. This transport is used in order to significantly accelerate the firing of the main line between the main electrodes, whereby the load of the trigger electrode and the sandwich structure can be reduced and the residual voltage of the spark gap drops.

The plasma jet effect explained previously is characterized by the expression of a preferred direction of the ionized gas flow. According to the prior art, measures can be taken to, on the one hand, influence the emergence of the beam but also the direction in such a way that there emerges the effect of a rapid firing of the main line. In order to overcome the air gap between the main electrodes, the proposed beam with its very effective ionization of air distances is particularly suitable, which, in turn, ensures an effective operation of the preferred horn spark gap. The electrode arrangement as well as the insulating layer and the layer made of the material with lower conductivity results in a preferred orientation of otherwise merely stochastic plasma jets. In particular, the material with lower conductivity can be suitable for gas delivery, which enables a further targeted generation of the plasma jet.

Compared to classic, uninsulated current trigger methods, the solution according to DE 10 2011 102 937 A1 offers the advantage of a very fast firing of the main spark gap, whereby all other components of the spark gap arrangement are less energetically loaded and thus can be designed in a miniaturized manner.

However, one disadvantage is the fact that even the smallest, relatively low-energy pulses of overvoltage events are sufficient to fire the entire spark gap. This results in a possible disadvantageous aging of the corresponding surge arrester arrangement.

From what was previously mentioned, it is therefore an object of the invention to specify an improved arrangement for firing spark gaps using a trigger electrode, wherein the basic principle of plasma jet firing should be reverted to in this respect in order to make use of the advantages provided by this, but, on the other hand, it should also be ensured that there is no resulting premature aging of appropriately equipped surge arresters with spark gaps of this type by preventing the actual overload range between the main electrodes, in particular the main electrodes of a horn spark gap, from being activated in the case of low energy contents of overvoltage events.

Achieving the object of the invention takes place with an arrangement according to the feature combination as claimed in claim 1, wherein the subclaims represent at least practical configurations and developments.

An arrangement for firing spark gaps with a trigger electrode which is located at or in one of the main electrodes and which is insulated from this main electrode is therefore assumed.

The trigger electrode can be electrically connected to the further main electrode via at least one voltage-switching or voltage-monitoring element.

There is an air gap between the main electrode and the further main electrode.

The trigger electrode forms a sandwich structure with an insulating layer and a layer made of a material with lower conductivity than the material of one of the main electrodes.

The insulating layer is preferably designed as a thin foil or lacquer layer. The layer made of the material of lower conductivity is in contact with one of the main electrodes or rests on it.

According to the invention, the arrangement is now further formed in such a way that an energetic limit or an energetic threshold value can be determined, wherein below the determined limit value or threshold value, energetically weak overvoltage events are discharged without response of the spark gap between the main electrodes. If the limit value or threshold value is exceeded, the correspondingly triggered discharge process takes place by firing the main spark gap.

For determining the limit value or threshold value and the means which are to be provided for this purpose, the basic concept of the invention continues to involve only reverting to those which can be integrated in the spark gap itself in a spatial and structural manner. An additional external circuitry for possible necessary housing feedthroughs and other structural measures must be explicitly ruled out.

According to the invention, for discharging energetically weak overvoltage events without response of the spark gap formed between the main electrodes, the insulating layer of the sandwich structure is therefore interrupted outside the firing area. Alternatively or additionally, an electrical component which influences the response behavior is connected between the trigger electrode and the main electrode integrated in the spark gap.

An electrical connection between the trigger electrode and the layer of lower conductivity is formed by interrupting the insulating layer, wherein the dischargeable energy content of the overvoltage event can be determined by the limited conductivity or the resistance of the layer of lower conductivity. As a result, the aforementioned limit value or threshold value can, in turn, be determined.

In one embodiment, the aforementioned electrical component is an integratable, miniaturized resistor.

Overvoltage events with the smallest energy contents, for example burst pulses, generally no longer result in the firing of the entire spark gap, since the low or minimum pulse energy is reduced in the layer of lower conductivity.

If the energy content of the overvoltage or the overvoltage event is higher, the entire spark gap fires in a virtually delayed manner. If the energy of the pulse exceeds a predetermined level, such a high voltage drops at the layer of lower conductivity that the auxiliary ignition spark gap fires and thus the main spark gap can be fired. The degree of delay can be influenced via the structural design and the material sizes or material properties. Firing the auxiliary ignition spark gap takes place by way of a flashover of the insulating section in the firing area.

In the case of all the overvoltages with higher energy contents, for example in the case of direct or indirect flash pulses, the main spark gap fires comparably fast, as is known from the prior art.

In one preferred configuration, the trigger electrode is formed by a conductor track of a foil printed circuit board and the insulating layer by an insulating cover, in particular a lacquer layer, on the conductor track.

The insulating cover is exposed for the interruption, so that the exposed section of the conductor track can be connected to the layer of lower conductivity.

The layer of lower conductivity can preferably consist of a conductive plastic material or can be formed from a material with a carbon fiber content.

The invention is explained in greater detail hereinafter using an exemplary embodiment and with the help of figures.

Figure 2:
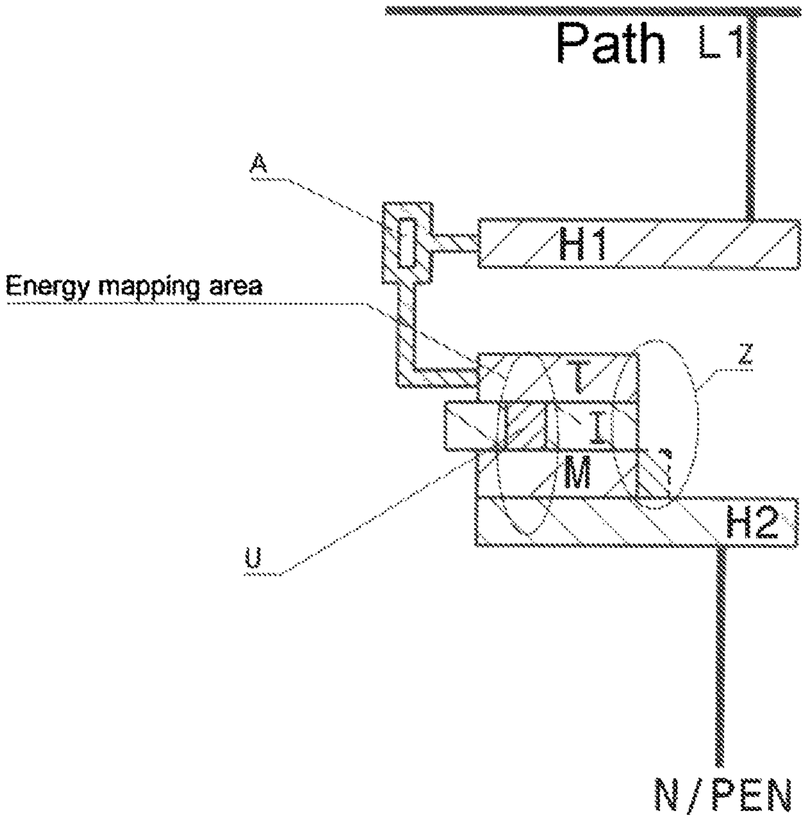

In this case, in the figures:

FIG. 1 shows an equivalent circuit diagram with the principal arrangement of main electrodes of a spark gap as well as a sandwich structure, comprising a trigger electrode with an insulating layer as well as a layer made of a material of lower conductivity than the material of one of the main electrodes and a parallel connection of an electrical component in the form of a resistor between the trigger electrode and the associated main electrode and FIG. 2 shows a representation which is similar to FIG. 1 but with an indicated interruption of the insulating layer, so that the trigger electrode comes into contact with the layer with the material of lower conductivity outside the firing area, in order to achieve a direct discharge without response of the entire spark gap in the case of low energy contents of an overvoltage event.

The representation according to FIGS. 1 and 2 comprises an electrically conductive trigger electrode T which is covered by an insulating layer I in the direction of the main electrode H2.

The insulating layer I is followed by a layer made of a material M with lower conductivity.

The layer made of the material M rests on the surface of the second main electrode H2.

External elements can be connected between the trigger electrode T and the main electrode H1 via a connection A. The means provided there may include gas arresters, varistors, diodes or similar electrical components, for example.

The spark gap formed by the main electrodes H1 and H2 can be designed as a horn spark gap and is electrically connected between the paths L and N/PEN.

The represented configuration corresponds in principle to the arrangement for plasma jet generation according to DE 10 2011 102 937 A1 and the explanations therein on the structural design. In this respect, reference is made, on the disclosure side, to the relevant explanations in DE 10 2011 102 937 A1 which embody the knowledge of the relevant person skilled in the art in this case.

According to the invention, an electrical component R which influences the response behavior is connected between the trigger electrode T and the main electrode H2 according to FIG. 1. The value of the resistor R determines the response behavior and thus an energetic limit value based on the firing process of the corresponding spark gap.

In the case of low energy contents of corresponding overvoltage events, the voltage drop which results via the resistor R is not sufficient in order to enable firing in the firing area of the arrangement. It is therefore possible to directly discharge low-energy overvoltage events by way of the arrangement of the resistor R without the main spark gap responding and aging unnecessarily as a result.

According to the representation in FIG. 2, a fully integrated solution is shown instead of the parallel connection of the resistor R.

In this respect, the thin insulating layer I is interrupted outside the firing area and flashover area, so that a conductive connection of the trigger electrode T with the material of lower conductivity M takes place. This makes it possible, owing to the resistance value of the material M, to discharge overvoltage events via the path trigger electrode, material of lower conductivity M and a main electrode H2, without this resulting in a response of the main spark gap between the electrodes H1 and H2.

In such a case, the energy content of the overvoltage is therefore so low that there is only a very small current flowing and the voltage which drops in the poorly conductive material M is not sufficient to flash over the insulating layer I. The flashover area thus does not respond and the overvoltage is discharged by the energy mapping area alone.

In contrast, if the current increases very strongly as a result of an overvoltage event such that the voltage which drops in the material M flashes over the insulating layer I and generates an ignition spark, this results in firing of the entire spark gap.

In this embodiment variant of the invention, the layer made of a material M not only has the task of extending the ignition arc by extending the direct flashover gap from the trigger electrode T to the main electrode H2, in fact the resistance value of the poorly conductive material is used via the contacting of the trigger electrode with the layer M in order to discharge weak overvoltage events. This configuration makes it possible to completely dispense with any separate electrical or electronic components for controlling the response behavior, in particular in the case of very weak overvoltage events.

The invention claimed is:

1. An arrangement for firing spark gaps with a trigger electrode (T) which is located at or in one of the main electrodes (H2) and which is insulated from this main electrode (H2), wherein the trigger electrode (T) can be electrically connected to the further main electrode (H1) via at least one voltage-switching or voltage-monitoring element (A) and there is an air gap between the trigger electrode (T) and the further main electrode (H1), wherein the trigger electrode (T) forms a sandwich structure with an insulating layer (I) and a layer made of a material (M) with lower conductivity than the material of one of the main electrodes (H1, H2), the insulating layer (I) is designed as a thin foil or lacquer layer and the layer made of the material (M) of lower conductivity is in contact with one of the main electrodes (H2) or rests on it, characterized in that for discharging energetically weak overvoltage events without response of the spark gap formed between the main electrodes (H1; H2), the insulating layer (I) of the sandwich structure is interrupted outside the firing area and/or an electrical component which influences the response behavior is connected between the trigger electrode (T) and the main electrode (H2).

2. The arrangement as claimed in claim 1, characterized in that an electrical connection between the trigger electrode (T) and the layer (M) is formed by interrupting (U) the insulating layer (I), wherein the limited conductivity or the resistance of the layer (M) determines the dischargeable energy content of the overvoltage event.

3. The arrangement as claimed in claim 1, characterized in that the electrical component is a resistor (R).

4. The arrangement according to claim 1, characterized in that in the case of low energy content of the overvoltage event, a current flows to the main electrode (H2) by way of the electrical component (R) and/or the layer (M), wherein the measure of the voltage drop at the electrical component (R) and/or at the layer (M) determines whether the overvoltage is directly discharged or whether the voltage drop results in a flashover of the insulating section (I) in the firing area or flashover area (Z) and thus in firing of the spark gap between the main electrodes (H1 and H2).

5. The arrangement according to claim 1, characterized in that the trigger electrode (T) is formed by a conductor track of a foil printed circuit board and the insulating layer (I) by an insulating cover, in particular a lacquer layer, on the conductor track, wherein the insulating cover is exposed for the interruption (U), and the exposed area is in connection with the layer (M).

6. The arrangement according to claim 1, characterized in that the layer (M) consists of a conductive plastic material.

7. The arrangement according to claim 1, characterized in that the layer (M) consists of a material with carbon fiber content.

* * * * *